Patented Aug. 16, 1932

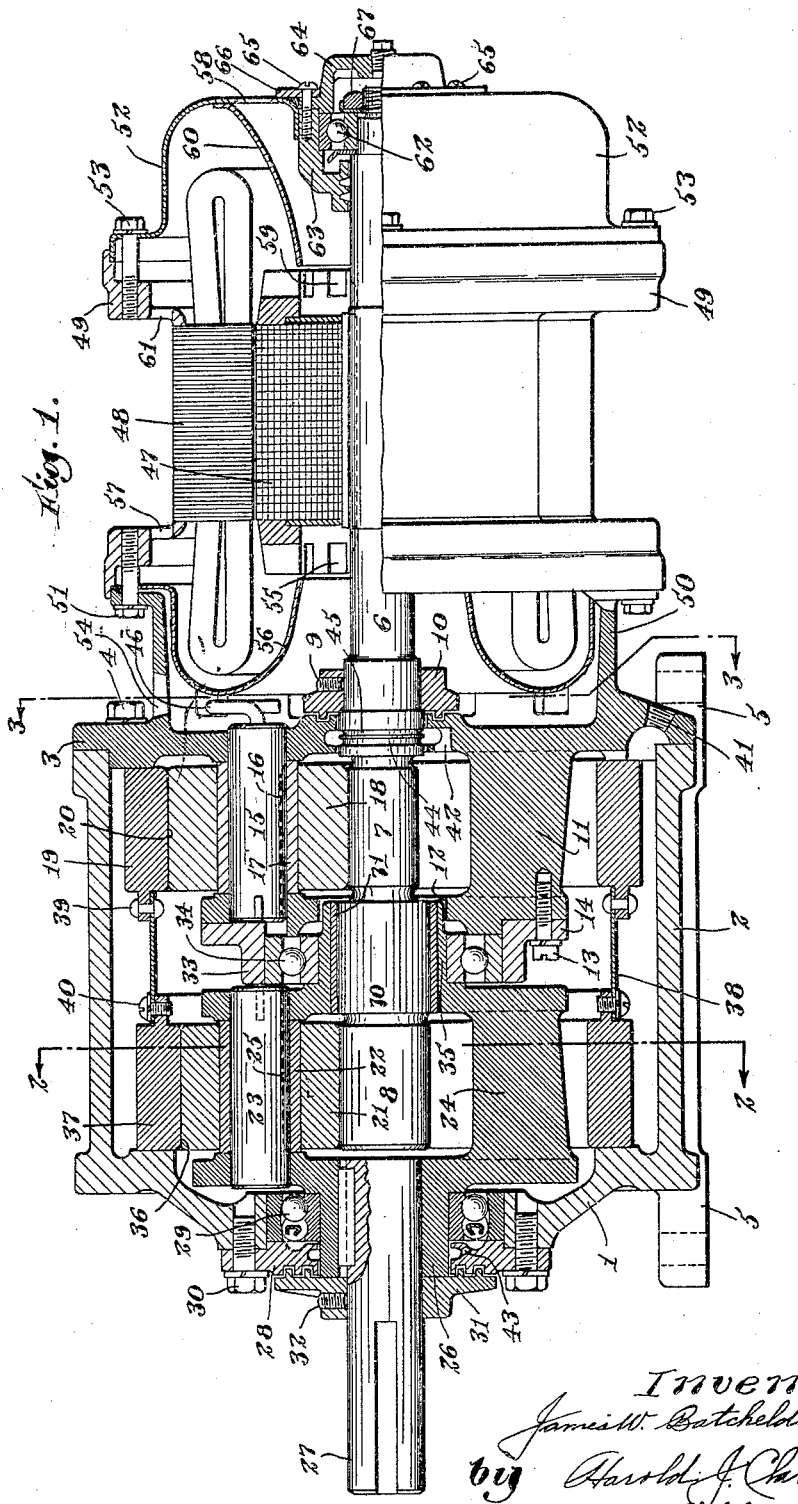

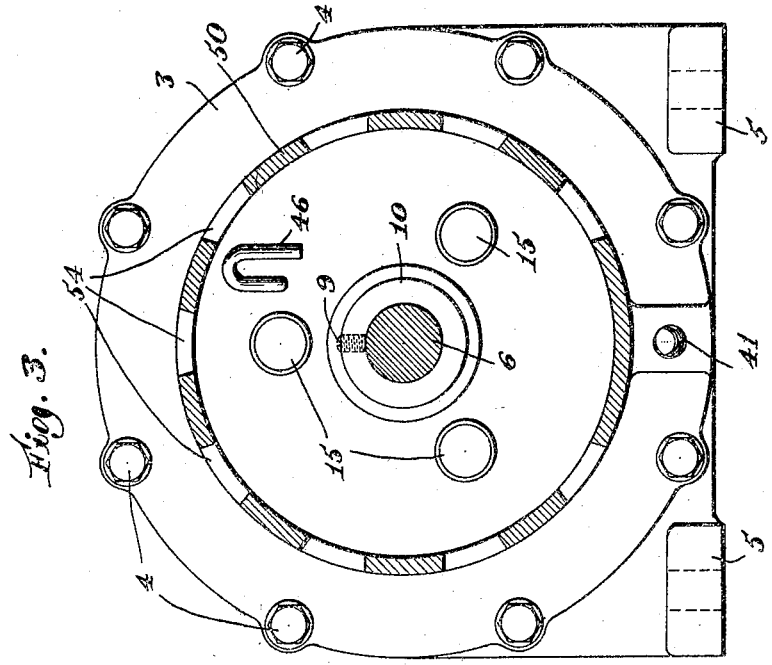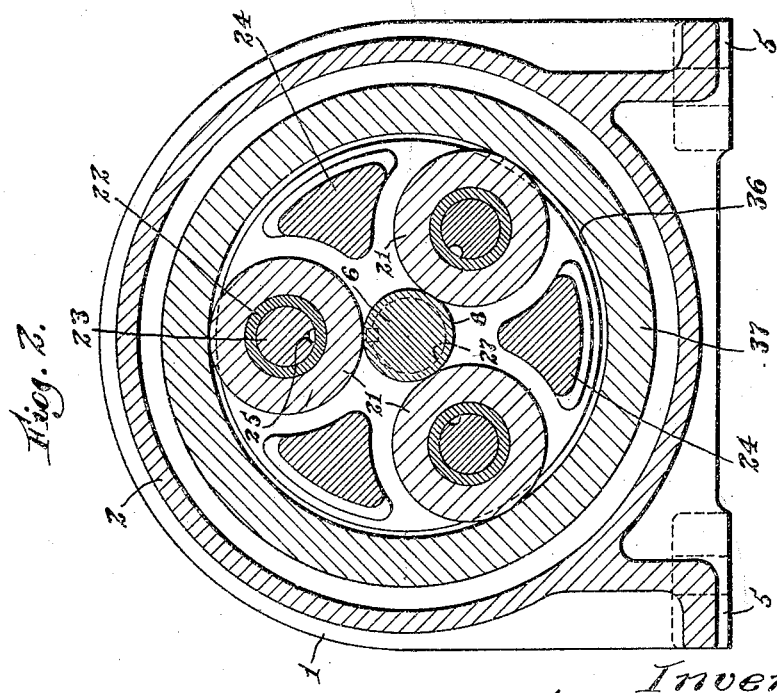

1,871,835

UNITED STATES PATENT OFFICE

JAMES W. BATCHELDER, OF BROOKLINE, MASSACHUSETTS

GEARLESS SPEED CHANGE MECHANISM

Application filed December 11, 1930. Serial No 501,484.

My present invention relates to devices or apparatus for use in the reduction or increasing of speeds.

An important object of the present invention is the provision of a speed changing mechanism in which the use of toothed gears is entirely eliminated.

Another important object of the present invention resides in the utilization of the principle of adhesion between hardened and ground contacting steel surfaces.

Another object of the invention resides in the fact that by the utilization of toothless contacting driving and driven members, the losses and other disadvantages occasioned by the use of toothed gears are eliminated, resulting in a speed transmission mechanism of high efficiency, greater compactness and strength, and quiet and vibrationless to a maximum degree.

Silence of operation is essential in many applications, and this advantage is achieved in my present mechanism.

Furthermore, the oil or lubricant utilized is not churned to a foamy condition, which condition exists in speed transmission mechanisms of the toothed gear type.

Furthermore, by the utilization of toothless driving and driven members, the cost of cutting the gear teeth is totally eliminated, and greater strength is obtained, not only in the high speed shaft, but in all cooperating parts, due to the fact that there are no teeth cut in the contacting areas.

Furthermore, absolute precision of ratio is possible of attainment because of the elimination of detrimental stepped effects caused by varying tooth quantities, that is, a variation from ten to eleven or to twelve teeth in one member, and the like. Also, because of the elimination of the toothed contacting surfaces or areas, rupturing of parts within the mechanism is eliminated, on stalling of the load or other occasions.

Another object of my present invention resides in the coupling of the speed transmission mechanism and the driving motor in a self-contained unit, from which combination many advantages are obtained. For example, the space otherwise required, especially longitudinally, is materially reduced over structures employing separate motor, coupling, and baseplate. The weight of such a combined unit over separately mounted transmission mechanism and motor is reduced, owing to the absence of the baseplate and coupling. Also, I am enabled to eliminate the pulley end shield and its high speed shaft bearing, as well as the high speed shaft bearing in the transmission casing end plate adjacent to the motor, thus still further decreasing the weight of the combined unit and lessening the cost of construction of my novel device, by reducing otherwise required machining and other work.

A further advantage of my novel mechanism resides in the fact that one size of reduction mechanism is capable of use in conjunction with motors in a large range of power, thus eliminating the possibility of assembling a motor of a given power, with an incorrect size of reduction unit. I am also enabled to utilize motors of a single speed, thus greatly reducing motor costs and enabling my combined unit of reduction mechanism and motor to be constructed at a minimum of cost.

Furthermore, the utilization of a single speed motor, preferably high speed, will greatly reduce the size and space necessary for both the prime mover and the reduction unit. By the use of my novel speed transmission mechanism I am enabled to reduce the speeds of present prime movers, such as electric motors, to entirely practical and useable degrees.

Furthermore, my novel reduction unit permits the releasing of all present restrictions as to the operating speeds of said prime movers, irrespective of the ultimate speed of the driven mechanism utilized.

A further object of the invention is the provision of speed transmission mechanism capable of being easily and readily reversible in its rotational direction.

A further feature of the invention resides in the fact that by the utilization of my apparatus a wide range of speed reduction is obtainable with the entire elimination of all detrimental step effects.

My improved apparatus may be applied to or operated by prime movers of any type or nature, such as steam driven engines, turbines, gas engines, oil engines, electric motors or any other type of prime mover. All of those prime movers just mentioned tend to develop increased horsepower as their speed is increased. Such speed heretofore has been limited to a great extent by the speed reduction unit or mechanism which has been interposed between the source of power and the driven machine or element. Such prior reduction units when constructed with high ratios, such as the worm drive, have been inefficient or are extremely intricate, complicated, cumbersome and expensive. This is particularly true when utilizing the multiple stage planetary transmission.

Another object of the present invention, therefore, is the elimination or obviating of the above outlined difficulties and disadvantages which have been present in prior speed reduction mechanisms.

By my improved apparatus the amount of available energy is greatly increased, with a consequent decrease in the fuel or power necessary to be supplied to a prime mover.

Another feature of my present invention resides in the fact that with my improved mechanism I am enabled to generate and deliver a tremendous torque or turning effect.

In my present apparatus there is no limit to the amount of reduction which may be obtained, as has been present in prior multiple gear reduction units, worm drives, and complex belting and chain arrangements.

Because of the simplicity of construction of my improved device the time of continuous operation will be greatly increased owing to the low number of working parts and the simplicity and economy with which they may be replaced.

Many important advantages result from my invention; for example, when utilizing an electric motor as the prime mover a great saving in copper windings and other materials will be effected because of the increased operating speed permitted by my improved reduction mechanism.

Other types of prime movers may be made much smaller and correspondingly simpler as well as being, as will be readily understood, much less expensive than prior cumbersome mechanisms.

My improved speed reduction device is compact, inexpensive to manufacture, relatively light in weight and effective and efficient to a high degree. In the preferred form of the invention, the reduction unit is entirely housed within a unitary casing, which completely surrounds and encloses said unit, forming a dust-tight, oil-tight container. Because of this housed-in feature, likelihood of accidents or injury is reduced, there being no access to the working parts while the mechanism is functioning. In case of breakage of any of the rotating or moving parts in the reduction unit, the housing or casing will prevent injury by flying parts, a danger which is ever present in exposed mechanism or devices of this character. Also, by utilizing a single unitary casing, and providing a proper supply of lubricant therein, all working and moving parts will be constantly assured of adequate lubrication.

Another and important object of the invention resides in the provision of a speed reduction mechanism which is self-locking when the power is removed from the driving shaft. Thus when my improved apparatus is utilized in hoisting mecahnism, and it is desired to stop a load in mid air, the power may be removed from the driving shaft, and the load will remain in suspension. Thus my improved device constitutes an effective brake for holding the load or the work being operated upon at any desired point. It will be apreciated, of course, that the high speed shaft may be reversed in its rotation with equal facility and simplicity.

As illustrated in the drawings of the instant application, the reduction of speed is accomplished by means of two or more trains of toothless members, the interposed driving rollers of one train being fixed relative to the slow speed shaft, while the rollers of the other train are fixed to a spider or retainer, said retailer being mounted on a slow speed shaft in such manner and position as to receive an epicyclic motion imparted by the trains of traction members at a speed which is a resultant of the difference in size of the initial driving rollers, if any, the difference in size of the driven rings on the opposite sides of the interposed rollers, and the difference in peripheral speed of said oppositely positioned rings.

Other features and objects of the invention reside in the particular construction and arrangement of the parts thereof.

Another and important feature of the present invention is that by the structure illustrated, the high speed shaft is relieved of all radial loads and tangential forces, thus being free to carry out its function of transmitting torque without being encumbered in the manner heretofore required, thus enabling the high speed shaft to function at a higher degree of efficiency and torque transmission.

This is a very valuable feature, particularly in hoisting mechanism, as it enables the high speed shaft to transmit torque to the slow speed shaft through the medium of the reduction unit, without the necessity of carrying destructive and restraining burdens.

The above and other features of the invention, details of construction, combinations of parts, and advantages, will be hereinafter more fully pointed out, described and claimed.

Referring to the drawings, illustrating a preferred embodiment of the present invention, Fig. 1 is a longitudinal sectional view of the transmission unit assembled in unitary relation with a driving motor;

Fig. 2 is a vertical sectional view on the line 2—2 of Fig. 1; and

Fig. 3 is a vertical sectional view on the line 3—3 of Fig. 1.

Referring now to the drawings, for a particular description of the invention, its construction, assembly, and operation, my present device comprises an end plate or wall 1 having an integral cylindrical wall 2 to which the end wall 3 is affixed by bolts 4, apertured lugs 5 being formed integral with the combined walls 1 and 2 and providing means whereby the device may be fixed to a bench table, floor or other desirable support.

A high speed shaft 6 projects through a central aperture in the end wall 3, and formed on said high speed shaft 6 are two cylindrical driving rollers or surfaces 7 and 8, these rollers being illustrated as of varying diameters. Fixed to the high speed shaft 6 by a set screw 9 is an excluding cap or collar 10, adapted to rotate with the shaft 6 and to prevent the entrance of dust, dirt, grit, or other foreign matter into the reduction unit casing. Projecting inwardly from the wall 3 is a plurality of webs 11 having a ring 12 formed integral therewith, and secured to the ring 12 and webs 11 by bolts 13 is a second ring 14, the webs 11, and rings 12 and 14 constituting a retainer in which are keyed a plurality, preferably three, of pins or shafts 15, these shafts being provided with oil grooves 16. A bushing 17 surrounds each shaft 15, and mounted on each bushing 17 is a cylindrical roller 18. The rollers 18 are confined within a ring 19 having a cylindrical bearing face 20 opposed to and parallel with the bearing face of the roller 7 on the high speed shaft 6. The rollers 18 being supported by their retainer, and said retainer constituting an integral part of the casing, it will be apparent that the ring 19 is also supported by said casing, thus imposing no radial load upon the high speed shaft 6. The rollers 18 are held in the ring 19 under a press fit of considerable pressure, and the roller 7 is confined between the rollers 18 under the same pressure. All the contacting surfaces of the roller 7, rollers 18, and surface 20 of the ring 19 are of hardened and ground steel, thus providing perfect rolling action between all of said elements, with no sliding friction to cause wear.

The roller 8 on the high speed shaft is in engagement with a plurality of rollers 21, preferably three in number, said rollers being mounted on bushings 22 surrounding shafts 23 keyed in a retainer 24, said shafts being provided with oil grooves 25 similar to the oil grooves 16. The retainer 24 is provided on one side with a tubular flange 26 through the medium of which said retainer is keyed to the slow speed shaft 27. Held in the end wall 1 by a ring 28 is an anti-friction bearing 29, constituting a support for the retainer 24 and slow speed shaft 27. Hence, it will be apparent that the retainer 24 and slow speed shaft 27 are in reality supported by the casing. The ring 28 is held to the end wall 1 by bolts 30, and a cap 31 is fixed to the slow speed shaft by a set screw 32, said cap 31 rotating with the slow speed shaft 27 and performing the same dirt and grit excluding function as the cap 10. The ring 14, constituting part of the first described retainer, is provided with an annular flange 33 constituting a seat for an anti-friction bearing 34, and the retainer 24 is provided with a tubular journal 35 projecting within and supported by the bearing 34. It will thus be apparent that both retainers and the rollers carried thereby are supported by the casing. In engagement with the rollers 21 is the bearing face 36 of a ring 37, said face 36 being opposed to and parallel with the face of the roller 8 on the high speed shaft 6. The two rings 19 and 37 are united by a cylindrical web 38, said web being fixed to each of said rings in any desired manner, as by the rivets 39 and screws 40.

It will be noted, from a glance at the drawings, that the roller 8 is of a greater diameter than the roller 7, that the rollers 21 are of less diameter than the rollers 18, and that the bore 36 of the ring 37 is of a less diameter than the bore 20 of the ring 19.

Therefore, on rotation being imparted to the high speed shaft 6, the driving roller 7 will likewise be rotated at the same speed as the shaft 6. Thereupon the interposed rollers 18 will be rotated, effecting a rotation of the ring 19 in a direction opposite to the direction of rotation of the roller 7. The rotative speed of the ring 19 will be considerably less than the rotative speed of the roller 7, due to the difference in ratios between the face 20 of said ring 19 and the diameter of the roller 7. Simultaneously with the rotation of the roller 7, the roller 8 will be rotated. Rotation of said roller 8 will effect rotation of the interposed rollers 21 which are in engagement with the face 36 of the ring 37, and would normally tend to rotate said ring 37 at a speed of rotation faster than the speed of rotation of the ring 19. This tendency on the part of the roller 8 to rotate the ring 37 faster than the ring 19 is overcome by the rotation of the ring 19 by the roller 7, said ring 19 and roller 7 restraining the ring 37 from rotating faster than it is rotated by the roller 7 and ring 19. As the rollers 18 are fixed against epicyclic movement, said restraining force on the ring 37 will set up an epicyclic movement of the interposed or idler rollers 21 around the driving roller 8. This epicyclic movement will in turn be imparted to the retainer 24 and hence to the slow speed shaft 27 to which said retainer is keyed. The ratio of speed between the slow speed shaft 27 and the high speed shaft 6 will thus be dependent upon the varying ratios between the two trains of traction or adhesion members.

It will thus be apparent that an infinite variation of ratios is possible, through my invention, in simple structure. No prior speed reduction mechanism, of which I am aware, is capable of producing these high ratios without the use of complicated, expensive, cumbersome, and inefficient structures.

The advantages, benefits, savings, high ratios of speed reductions, and other features of this invention will be instantly apparent to those skilled in this art, and since I believe that the mechanism by means of which these advantages are obtained is novel, I have claimed the same in the present application.

While I have illustrated the driving rollers 7 and 8 as being integral with the high speed shaft 6, it will be appreciated that said driving rollers may be separately formed and rigidly secured to the shaft 6 with equal facility.

An important feature of economy in the mechanism of the present application resides in the fact that the idler rollers 18 and 21, together with the driving rollers 7 and 8, particularly if separately formed, may all be ground in centerless grinders, thus greatly reducing the cost of manufacture of these portions of my novel apparatus.

My improved reduction unit will automatically function as a brake, or means to hold a load or work being operated upon in any desired position. If it is assumed that the device is being utilized as a hoisting mechanism, and a load has been raised to a point at which it is desired to be held, the high speed shaft 6 may be stopped, and the load will remain in suspension. Any tendency on the part of the load to set up a reverse movement within the reduction unit will be overcome by the fact that such movement would be transmitted to the rollers 18, but, because of the fact that said rolers are simultaneously engaged on opposite sides, such movement would be thereby restrained.

It will also be apparent, from a glance at the drawings, that the high speed shaft 6 is relieved of all radial loads of any nature, as well as any tangential force, each roller 7 and 8 being diametrically or oppositely engaged by the rollers 18 and 21, and the weight or load of all rollers, retainers, and rings 19 and 37, being supported and carried by the casing. Thus, the high speed shaft is freed of restraint, and is enabled to function simply and solely to transmit torque from any desired source of power, through the rollers 7 and 8 to the differential or reduction unit. As a matter of fact, the high speed shaft itself is supported by the casing through the medium of the bearing surface 70 and the retainers 24 and 11, and it will be noted that there is no bearing for the high speed shaft 6 in the wall 3. Thus there is no possibility of misalinement between a bearing in the wall 3 and the position of the high speed shaft rollers 7 and 8 in the reduction unit, thus leaving the rollers 7 and 8 free to find their own centers and perform their functions without interference. A bushing 71 is provided between the surface 70 and the journal portion 35 of the retainer 24. This support at the working end of the high speed shaft will obviate any motor trouble which might otherwise arise should wear occur between the rollers 7 and 8 and their cooperating members.

It will also be noted, from a glance at the drawings, that the rings 19 and 37 are restrained against any longitudinal movement or play by their bearing against the inner surfaces of the end walls 1 and 3.

A tapped hole 41 is provided in the lower edge of the wall 3, to which an oil filler pipe may be attached, this pipe being of a height above the normal oil level in the casing. The hole 41 may also be utilized to drain the lubricant from the casing. Any oil which works outwardly along the high speed shaft 6 will be returned to the casing by the lead 42, and any oil which works outwardly along the slow speed shaft 27 will be returned through the lead 43. An oil throwing flange 44 is provided in the groove 45 on the high speed shaft 6, as is usual.

A ventilation or breather tube 46 is provided through the wall 3, this tube 46 being so constructed, shaped and arranged as to prevent the discharge of oil from the interior of the casing, and to prevent the ingress of dust, dirt, or grit to the interior of said casing.

If desired, a very efficient and satisfactory low ratio speed reducer may be obtained by eliminating the roller 7 and its cooperating train of traction members and utilizing simply the driving roller 8 and its accompanying train of traction members. In this instance the ring 37 would be fixed against rotation, and the retainer 24 would be supported directly by the housing instead of in the retainer flange or bearing 33. Such a reducer would be simple and economical to manufacture and assemble, and would be highly efficient within its range of operation, although such range would of necessity be restricted to relatively low speed change ratios. High efficiency would be obtained because of the parallel opposed faces of the roller 8 and ring 37, and the cylindrical rollers 21 working between said surfaces.

A speed reducer constructed according to this last brief description is obviously within the scope of the present invention, and claims thereto have, therefore, been included in this application.

In the drawings of the present application I have illustrated my novel speed reducing mechanism as driven by an electric motor, the rotor 47 of which is directly mounted on the high speed shaft 6, the stator 48 being fixed in a tubular casing 49 secured to the flanged wall 50 of the end wall 3 by bolts 51. An end shell 52 is fixed to the casing 49 at the outer end thereof by bolts 53.

Apertures 54 are provided through the wall 50, and vanes 55 on the rotor 47 will draw air inwardly through the ports or apertures 54 around the web 56, and out through the ports 57 in the casing 49. Ports 58 are provided in the shell 52, and the vanes 59 on the opposite end of the rotor 47 will draw air inwardly through the ports 58, around the web 60, and out through the ports 61 in the casing 49. Thus ample ventilation and cooling of the motor is assured. The outer end of the high speed shaft is supported in an antifriction bearing 62, said bearing being mounted in an annular member 63 and held therein by a cap 64, screws 65 holding a ring 66 and the cap 64 in position. A nut 67 is threaded on to the free end of the high speed shaft 6 and bears against the inner race of the bearing 62, the cap 64 bearing against the outer race as clearly illustrated.

It will be noted, from a glance at Fig. 1, that the entire assembly of reduction unit and motor is supported by the lugs 5, thus giving a strong and ample bearing and support for the reduction unit, and relieving the same of the undue loads which would be imparted thereto were the supports for the mechanism located beneath the motor. These centralized supports reduce vibration and increase the working life of my novel mechanism to a marked degree.

Furthermore, by total elimination of the high speed shaft bearing in the wall 3, any possibility of misalinement between said bearing and the location of the rollers 7 and 8 in the reduction unit is obviated. If such a bearing were utilized, in the wall 3, and there should exist a slight discrepancy in alinement between the bearing points of the rollers 7 and 8 and the said high speed shaft bearing in the wall 3, an undue load would be imposed on the high speed shaft, whereas, by eliminating the wall bearing, the rollers 7 and 8 on the inner end of the high speed shaft are permitted to locate themselves in proper alinement, without exerting or imposing any load or distortion on the high speed shaft.

The outer end of the high speed shaft is supported in the bearing 62, and the inner end of the high speed shaft, comprising the rollers 7 and 8, is supported by the casing itself, through the medium of the rollers 18 and 21, and the retainers 11 and 24, these constituting ample supports for the high speed shaft, and permitting said high speed shaft to carry out its function of torque transmission from the motor completely freed from the restraints which would be imposed thereon if the high speed shaft carried any radial loads or tangential forces in the reduction unit.

While I have necessarily described my present invention somewhat in detail, it will be appreciated that I may vary the size, shape, and arrangement of parts within reasonably wide limits, without departing from the spirit of the invention.

My invention is further described and defined in the form of claims as follows:

1. In a speed change mechanism, a casing, a slow speed shaft, a retainer rigidly fixed to said slow speed shaft, a high speed shaft, a pair of driving rollers rotatable by said high speed shaft and having outer cylindrical faces, a second retainer fixed to said casing and constituting a support for said first retainer, said first retainer constituting a support for said high speed shaft, a pair of rings rotatable in said casing, each of said rings having an inner cylindrical face parallel with and opposed to the outer cylindrical face of its respective driving roller, and a plurality of rollers interposed between each of said driving rollers and its respective ring, said rollers constantly bearing on and being confined under pressure between said parallel opposed faces.

2. In a speed change mechanism, a casing, a slow speed shaft, a retainer rigidly fixed to said slow speed shaft, a high speed shaft, a pair of driving rollers rotatable by said high speed shaft and having outer cylindrical faces, a second retainer fixed to said casing and constituting a support for said first retainer, a pair of flexible rings rotatable in said casing, each of said rings having an inner cylindrical face parallel with and opposed to the outer cylindrical face of its respective driving roller, and a plurality of rollers interposed between each of said driving rollers and its respective ring, said rollers constantly bearing on and being confined under pressure between said parallel opposed faces.

3. In a speed change mechanism, a casing, a slow speed shaft, a retainer rigidly fixed to said slow speed shaft, a high speed shaft, a pair of driving rollers rotatable by said high speed shaft and having outer cylindrical faces, a second retainer fixed to said casing and constituting a support for said first retainer, a pair of rings rotatable in and supported by said casing, each of said rings having an inner cylindrical face parallel with and opposed to the outer cylindrical face of its respective driving roller, and a plurality of rollers interposed between each of said driving rollers and its respective ring, said rollers constantly bearing on and being confined under pressure between said parallel opposed faces.

4. In a speed change mechanism, a casing, a slow speed shaft, a retainer rigidly fixed to said slow speed shaft, a high speed shaft, a pair of driving rollers rotatable by said high speed shaft and having outer cylindrical faces, a second retainer fixed to said casing, a tubular journal on said second retainer constituting a support for said first retainer, a tubular journal on said first retainer constituting a support for said high speed shaft, a pair of flexible rings rotatable in and supported by said casing, each of said rings having an inner cylindrical face parallel with and opposed to the outer cylindrical face of its respective driving roller, and a plurality of rollers interposed between each of said driving rollers and its respective ring, said rollers constantly bearing on and being confined under pressure between said parallel opposed faces.

5. In a speed change mechanism, a casing, a slow speed shaft, a retainer rigidly fixed to said slow speed shaft, a high speed shaft, a pair of driving rollers rotatable by said high speed shaft and having outer cylindrical faces, a second retainer fixed to said casing, a bearing on said second retainer constituting a support for said first retainer, a tubular journal on said first retainer supported by said housing and constituting a support for said high speed shaft, a pair of flexible rings rotatable in said casing, each of said rings having an inner cylindrical face parallel with and opposed to the outer cylindrical face of its respective driving roller, and a plurality of rollers interposed between each of said driving rollers and its respective ring, said rollers constantly bearing on and being confined under pressure between said parallel opposed faces.

6. In a speed change mechanism, a casing, a slow speed shaft, a retainer rigidly fixed to said slow speed shaft, a high speed shaft, a pair of driving rollers rotatable by said high speed shaft and having outer cylindrical surfaces, a second retainer fixed to said casing and constituting a support for said first retainer, said high speed shaft having a cylindrical bearing portion intermediate said rollers, one of said retainers spanning a driving roller and constituting a support for said high speed shaft intermediate said driving rollers, a pair of rings rotatable in said casing, each of said rings having an inner cylindrical face parallel with and opposed to the outer cylindrical face of its respective driving roller, and a plurality of rollers interposed between each of said driving rollers and its respective ring, said rollers constantly bearing on and being confined under pressure between said parallel opposed faces.

7. In a speed change mechanism, a casing, a slow speed shaft, a retainer rigidly fixed to said slow speed shaft, a high speed shaft, a pair of driving rollers rotatable by said high speed shaft and having outer cylindrical surfaces, a second retainer fixed to said casing and constituting a support for said first retainer, said high speed shaft having a cylindrical bearing portion intermediate said rollers, one of said retainers spanning a driving roller, a tubular journal on said first retainer housing said cylindrical bearing portion and constituting a support for said high speed shaft intermediate said driving rollers, a pair of rings rotatable in said casing, each of said rings having an inner cylindrical face parallel with and opposed to the outer cylindrical face of its respective driving roller, and a plurality of rollers interposed between each of said driving rollers and its respective ring, said rollers constantly bearing on and being confined under pressure between said parallel opposed faces.

In testimony whereof, I have signed my name to this specification.

JAMES W. BATCHELDER.